United States Patent
Jin et al.

(10) Patent No.: US 9,781,977 B2
(45) Date of Patent: Oct. 10, 2017

(54) INTERLOCKING WEB CONNECTORS FOR OCCUPANT RESTRAINT SYSTEMS AND ASSOCIATED METHODS OF USE AND MANUFACTURE

(71) Applicant: Shield Restraint Systems, Inc., Elkhart, IN (US)

(72) Inventors: Kevin Jin, Kunshan (CN); Jerry Huang, Yibin (CN); Adriaan Siewertsen, Veldhoven (NL)

(73) Assignee: Shield Restraint Systems, Inc., Elkhart, IN (US)

( * ) Notice: Subject to any disclaimer, the term of this patent is extended or adjusted under 35 U.S.C. 154(b) by 58 days.

(21) Appl. No.: 14/879,881

(22) Filed: Oct. 9, 2015

(65) Prior Publication Data

US 2017/0042293 A1    Feb. 16, 2017

Related U.S. Application Data

(60) Provisional application No. 62/203,899, filed on Aug. 11, 2015.

(51) Int. Cl.
*A47C 31/00* (2006.01)
*A44B 11/25* (2006.01)
(Continued)

(52) U.S. Cl.
CPC ...... *A44B 11/2561* (2013.01); *A44B 11/2523* (2013.01); *A44B 11/2503* (2013.01);
(Continued)

(58) Field of Classification Search
CPC ............ A44B 11/2561; A44B 11/2553; A44B 11/2549; A44B 11/2511; A44B 11/2503;
(Continued)

(56) References Cited

U.S. PATENT DOCUMENTS 3,799,610 A    3/1974    Hollins
4,604,773 A    8/1986    Weber et al.
(Continued)

FOREIGN PATENT DOCUMENTS

DE    4420457    12/1995
EP    1472949    11/2004
(Continued)

*Primary Examiner* — Chi Q Nguyen
(74) *Attorney, Agent, or Firm* — Perkins Coie LLP (57) ABSTRACT

Web connectors for use in occupant restraint systems in a vehicle are disclosed herein. In one embodiment, first and second web connectors include first and second web receiving portions, respectively. The first web receiving portion includes a first projection at a first side and a first recess adjacent a second side opposite the first side. The first recess includes a first surface feature. The second web receiving portion includes a second recess and a second projection having a second surface feature. In this embodiment, the second recess is configured to receive the first projection, the first recess is configured to receive the second projection, and the first surface feature is configured to engage the second surface feature to resist movement between the first and second connectors during use.

16 Claims, 5 Drawing Sheets

(51) Int. Cl.
*B60R 22/10* (2006.01)
*B60R 22/12* (2006.01)

(52) U.S. Cl.
CPC .......... *A44B 11/258* (2013.01); *A44B 11/2511* (2013.01); *A44B 11/2549* (2013.01); *A44B 11/2553* (2013.01); *B60R 22/105* (2013.01); *B60R 22/12* (2013.01); *Y10T 24/45623* (2015.01)

(58) Field of Classification Search
CPC .. B60R 22/12; B60R 22/105; Y10T 24/45623
USPC ......... 297/464, 484, 468; 24/633; 280/801.1
See application file for complete search history.

(56) References Cited

U.S. PATENT DOCUMENTS

| | | | |
|---|---|---|---|
| 4,679,852 A | 7/1987 | Anthony et al. | |
| 4,699,401 A | 10/1987 | Saenz | |
| 4,715,096 A | 12/1987 | Fleming et al. | |
| 4,738,485 A | 4/1988 | Rumpf | |
| 4,785,906 A | 11/1988 | Kang | |
| 4,884,652 A | 12/1989 | Vollmer | |
| 4,886,315 A | 12/1989 | Johnson | |
| 4,989,299 A | 2/1991 | Morita | |
| 5,038,446 A | 8/1991 | Anthony et al. | |
| 5,061,012 A | 10/1991 | Parker et al. | |
| 5,142,748 A | 9/1992 | Anthony et al. | |
| 5,182,837 A | 2/1993 | Anthony et al. | |
| 5,220,713 A * | 6/1993 | Lane, Jr. ............ | A44B 11/2549 24/628 |
| 5,233,732 A | 8/1993 | Yamanishi | |
| 5,283,933 A * | 2/1994 | Wiseman ............ | A44B 11/2511 24/579.11 |
| 5,383,708 A | 1/1995 | Nagasaka et al. | |
| 5,429,419 A | 7/1995 | Kassai et al. | |
| 5,458,369 A | 10/1995 | Matsuki et al. | |
| 5,482,352 A | 1/1996 | Leal et al. | |
| 5,526,556 A | 6/1996 | Czank | |
| 5,624,156 A | 4/1997 | Leal et al. | |
| 5,681,094 A | 10/1997 | Brown et al. | |
| 5,699,594 A | 12/1997 | Czank et al. | |
| 5,765,774 A | 6/1998 | Maekawa et al. | |
| D397,063 S | 8/1998 | Woellert et al. | |
| 5,788,281 A | 8/1998 | Yanagi et al. | |
| 5,813,097 A * | 9/1998 | Woellert ............ | A44B 11/2511 24/587.12 |
| 5,851,025 A | 12/1998 | Gamboa | |
| 5,873,599 A | 2/1999 | Bauer et al. | |
| 5,890,762 A | 4/1999 | Yoshida | |
| 5,898,366 A | 4/1999 | Brown et al. | |
| 5,970,587 A | 10/1999 | Knox | |
| 6,024,408 A | 2/2000 | Bello et al. | |
| 6,079,744 A | 6/2000 | Husby et al. | |
| 6,139,111 A | 10/2000 | Pywell et al. | |
| 6,182,783 B1 | 2/2001 | Bayley | |
| 6,305,713 B1 | 10/2001 | Pywell et al. | |
| 6,309,024 B1 * | 10/2001 | Busch ................ | B60R 22/00 24/170 |
| 6,357,790 B1 | 3/2002 | Swann et al. | |
| 6,374,168 B1 | 4/2002 | Fujii | |
| 6,540,293 B1 | 4/2003 | Quackenbush | |
| 6,547,218 B2 | 4/2003 | Landy | |
| 6,582,015 B2 | 6/2003 | Jessup et al. | |
| 6,606,770 B1 * | 8/2003 | Badrenas Buscart ............ | A44B 11/2511 24/625 |
| 6,647,597 B2 | 11/2003 | Reiter | |
| 6,698,070 B2 | 3/2004 | Chen | |
| 6,701,587 B1 | 3/2004 | Sato et al. | |
| 6,773,075 B2 | 8/2004 | Rouhana et al. | |
| 6,811,186 B1 | 11/2004 | Fraley et al. | |
| 6,817,629 B2 | 11/2004 | Herberg et al. | |
| 6,837,547 B2 | 1/2005 | Delventhal et al. | |
| 6,868,591 B2 * | 3/2005 | Dingman ............ | A44B 11/2511 24/615 |
| 6,997,474 B2 | 2/2006 | Midorikawa et al. | |
| 7,011,341 B2 | 3/2006 | Herberg et al. | |
| 7,077,472 B2 | 7/2006 | Steffens, Jr. | |
| 7,077,475 B2 | 7/2006 | Boyle | |
| 7,131,668 B2 | 11/2006 | Go | |
| 7,159,948 B1 | 1/2007 | Wolf | |
| 7,178,208 B2 | 2/2007 | Bentsen et al. | |
| 7,201,399 B2 | 4/2007 | Frank et al. | |
| 7,201,444 B2 | 4/2007 | Schimmoller et al. | |
| 7,216,827 B2 | 5/2007 | Tanaka et al. | |
| 7,246,854 B2 | 7/2007 | Dingman et al. | |
| 7,278,684 B2 | 10/2007 | Boyle | |
| 7,350,767 B2 | 4/2008 | Huang | |
| 7,410,212 B2 | 8/2008 | Lawrence et al. | |
| 7,422,283 B2 | 9/2008 | Patterson et al. | |
| 7,463,161 B2 | 12/2008 | Griffin et al. | |
| 7,466,221 B1 | 12/2008 | Lehr | |
| 7,520,036 B1 * | 4/2009 | Baldwin ............ | A44B 11/2523 24/635 |
| 7,625,048 B2 | 12/2009 | Rouhana et al. | |
| 7,673,906 B2 | 3/2010 | Bell | |
| 7,698,791 B2 * | 4/2010 | Pezza ................ | A44B 11/2549 24/579.11 |
| 7,770,969 B2 | 8/2010 | Boyle et al. | |
| 7,775,557 B2 | 8/2010 | Bostrom et al. | |
| 7,819,472 B2 | 10/2010 | Hutchinson et al. | |
| 7,976,092 B2 | 7/2011 | Meredith et al. | |
| 7,980,630 B2 | 7/2011 | Pos | |
| 8,002,348 B2 | 8/2011 | Jessup et al. | |
| 8,007,043 B1 | 8/2011 | Vuong | |
| 8,016,318 B2 | 9/2011 | Nezaki | |
| 8,016,676 B2 | 9/2011 | Carter | |
| 8,038,213 B2 | 10/2011 | Owens | |
| 8,066,303 B2 | 11/2011 | Nezaki | |
| 8,113,584 B2 | 2/2012 | Boyle et al. | |
| 8,251,445 B2 | 8/2012 | Pos | |
| 8,272,689 B2 | 9/2012 | Biaud et al. | |
| 2004/0251367 A1 | 12/2004 | Suzuki et al. | |
| 2006/0038436 A1 | 2/2006 | Siewertsen et al. | |
| 2006/0049677 A1 | 3/2006 | Lawrence et al. | |
| 2006/0137153 A1 * | 6/2006 | Cerruti ............... | A44B 11/2515 24/633 |
| 2007/0001495 A1 | 1/2007 | Boyle et al. | |
| 2007/0075574 A1 | 4/2007 | James | |
| 2007/0210639 A1 | 9/2007 | Berger et al. | |
| 2007/0228802 A1 | 10/2007 | Nakhla | |
| 2007/0261217 A1 * | 11/2007 | Buscart ............... | A44B 11/2515 24/633 |
| 2008/0093833 A1 | 4/2008 | Odate | |
| 2008/0246316 A1 | 10/2008 | Carine et al. | |
| 2009/0069983 A1 | 3/2009 | Humbert et al. | |
| 2009/0183348 A1 | 7/2009 | Walton et al. | |
| 2009/0278390 A1 | 11/2009 | Carter | |
| 2010/0033001 A1 | 2/2010 | Boyer | |
| 2010/0052385 A1 | 3/2010 | Martini | |
| 2010/0201170 A1 | 8/2010 | Brandl et al. | |
| 2010/0213753 A1 | 8/2010 | Humbert | |
| 2010/0253121 A1 | 10/2010 | Buckingham et al. | |
| 2011/0006569 A1 | 1/2011 | Davies | |
| 2011/0291451 A1 | 12/2011 | Westman | |
| 2012/0080917 A1 * | 4/2012 | Miller ................. | B60N 2/2812 297/250.1 |
| 2012/0193955 A1 | 8/2012 | Seike | |
| 2013/0038101 A1 | 2/2013 | Friedman | |

FOREIGN PATENT DOCUMENTS

| | | |
|---|---|---|
| EP | 1547484 | 6/2005 |
| EP | 1631166 | 3/2006 |
| JP | 2005178513 | 7/2005 |
| JP | 4604482 | 1/2011 |
| WO | WO-2006044809 | 4/2006 |
| WO | WO-2012037398 | 3/2012 |
| WO | WO-2013016310 | 1/2013 |

\* cited by examiner

INTERLOCKING WEB CONNECTORS FOR OCCUPANT RESTRAINT SYSTEMS AND ASSOCIATED METHODS OF USE AND MANUFACTURE

CROSS-REFERENCE TO RELATED APPLICATION

The present application claims priority to U.S. Provisional Application No. 62/203,899, filed Aug. 11, 2015, which is incorporated herein by reference in its entirety.

TECHNICAL FIELD

The following disclosure relates generally to occupant restraint systems for use in vehicles, and more particularly, to web connectors for use with such restraint systems.

BACKGROUND

There are many types of occupant restraint systems for use in automobiles, aircraft, all-terrain-vehicles, and other vehicles. Such systems include, for example, seat belts for use by adults and children of sufficient size, and child seats with associated restraints for use by toddlers and small children.

One method of securing the seat belts or webs around an occupant includes releasably attaching a connector on an end portion of each of the webs to a buckle assembly. The buckle assembly retains the webs around the occupant during use, and also enables the occupant to release and separate the webs for egress after use. Conventional buckle assemblies can be positioned to the side of the occupant or in front of the occupant. For example, a "three point" harness system, as typically found in conventional automobiles, can include a shoulder web and a lap web that are releasably secured to a buckle assembly positioned to one side of the occupant's hip. A "five point" harness system can include a crotch web, first and second shoulder webs, and first and second lap webs that are releasably secured to a buckle assembly positioned proximate to the occupant's mid-section.

Some conventional web connectors are configured to interlock with one another so that they properly align when inserted into the buckle assembly. The buckle assembly will typically not engage the connectors if they are misaligned. In some cases, however, conventional buckle assemblies allow the connectors to move slightly during engagement. This movement can cause the connectors to rub against each other, leading to undesirable wear and tear. Accordingly, it would be advantageous to provide web connectors with reduced movement to reduce wear and tear during use.

DETAILED DESCRIPTION

The following disclosure describes various embodiments of web connectors for use with occupant restraint systems in vehicles. In some embodiments, a first web connector has a first web receiving portion configured to receive a first web and a first tongue portion configured to engage a buckle, and a second web connector has a second web receiving portion configured to receive a second web and a second tongue portion also configured to engage the buckle. The first web receiving portion can include a first side, a second side opposite the first side, a first projection at the first side, and a first recess adjacent the second side. The first recess has a first surface feature. The second web receiving portion includes a second recess and a second projection having a second surface feature. In use, the second recess is configured to receive the first projection, the first recess is configured to receive the second projection, and the first surface feature is configured to engage the second surface feature when the first and second tongue portions are engaged with the buckle. In one aspect of this embodiment, the configuration of the first and second web receiving portions can resist movement between the first and second connectors to reduce wear and tear during use.

Many of the details and features shown in the Figures are merely illustrative of particular embodiments of the technology. Accordingly, other embodiments can have other details and features without departing from the spirit and scope of the present technology. In addition, those of ordinary skill in the art will understand that further embodiments can be practiced without several of the details described below. Furthermore, various embodiments of the technology can include structures other than those illustrated in the Figures and are expressly not limited to the structures shown in the Figures. Moreover, the various elements and features illustrated in the Figures may not be drawn to scale.

In the Figures, identical reference numbers identify identical or at least generally similar elements. To facilitate the description of any particular element, the most significant digit or digits of any reference number refer to the Figure in which that element is first introduced. For example, element 107 is first introduced and described with reference to FIG. 1.

Figure 1A:
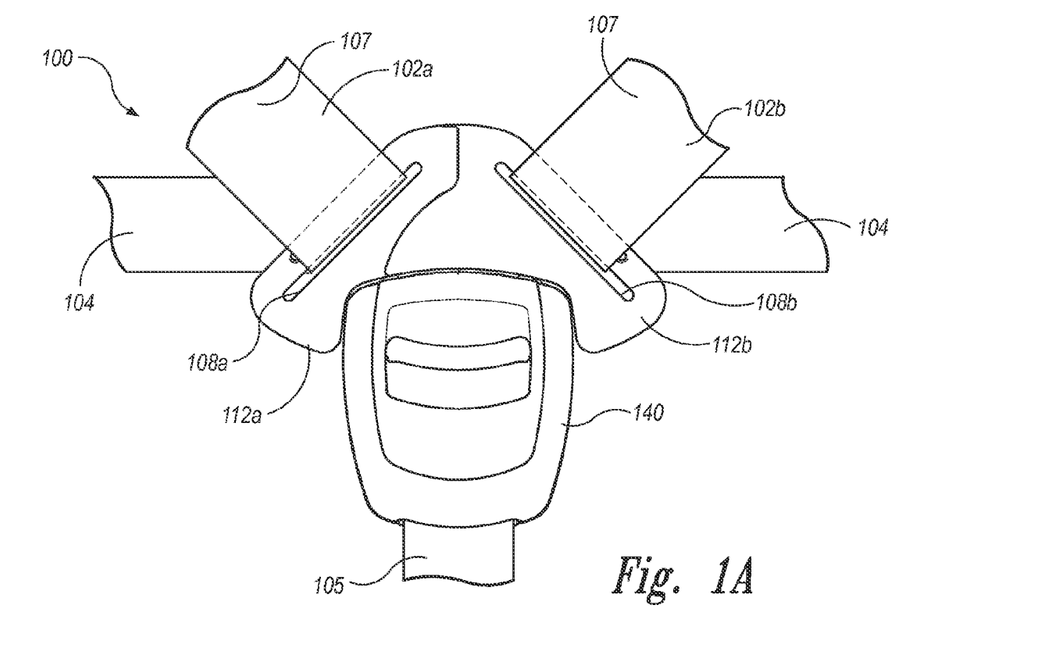
FIG. 1A is a front view and FIG. 1B is a rear view illustrating a portion of an occupant restraint system having first and second interlocking web connectors configured in accordance with an embodiment of the present technology.
Figure 1B:
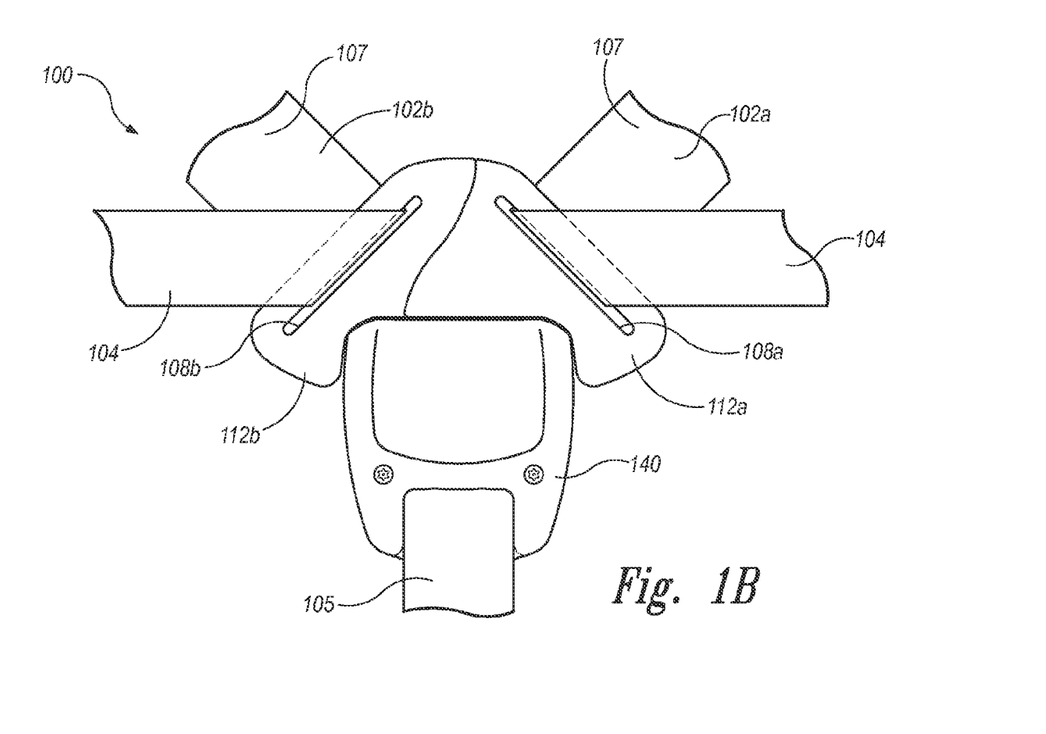

FIG. 1A is a front view and FIG. 1B is a rear view of a portion of an occupant restraint system 100 having a buckle assembly 140 ("buckle 140") releasably engaged with interlocking web connectors 112 (identified individually as a first web connector 112a and a second web connector 112b) configured in accordance with an embodiment of the present technology. Referring to FIGS. 1A and 1B together, each of the web connectors 112 includes a web receiving aperture 108 (identified individually as a first web receiving aperture 108a and a second web receiving aperture 108b) that slidably receives a corresponding upper web 102 (identified individually as a first upper web 102a and a second upper web 102b). The web receiving apertures 108 divide the corresponding upper webs 102 into a shoulder web portion 107 that extends over one of the occupant's shoulders and a lap web portion 104 that extends around a portion of the occupant's waste. The buckle 140 is configured to receive a lower web 105 (e.g., a crotch web) that extends downward between the occupants legs. The upper and lower webs 102 and 105 can include various types of woven fabric materials (e.g., nylon fabric) and/or other suitable belt or strap materials known in the art that provide sufficient strength, flexibility, durability and/or other characteristics. As used herein, the upper webs 102 and the lower web 105 can also be referred to as belts (e.g., seat belts), straps, etc. In some embodiments, end portions of the upper webs 102 and the lower web 105 can attach to anchor points on an occupant seat (e.g., a seat base, sidewalls, etc.; not shown) and/or on adjacent vehicle structures (not shown) using various methods known in the art. In some embodiments, the restraint system 100 and the corresponding web connectors 112 and the buckle 140 can be used to hold toddlers and small children in child seats (e.g., a child car seat). Embodiments of the present technology and applications of the web connectors disclosed herein, however, are not limited to a particular occupant seat arrangement or vehicle structure. For example, while in the illustrated embodiment the web connectors 112 and the upper and lower webs 102 and 105 are components of a "five point" restraint system, in other embodiments, the web connectors 112 and corresponding webs can be components of a "three point" restraint system or other multi-point restraint system.

Figure 2A:
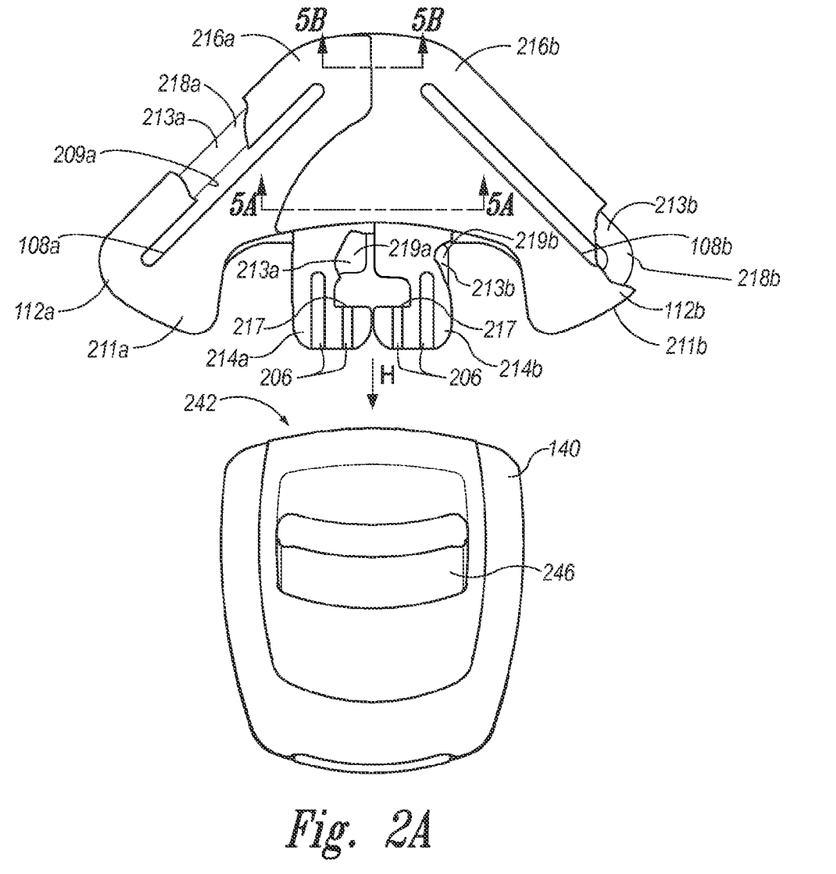
FIG. 2A is a front view of the web connectors disengaged from a buckle assembly.
Figure 2B:
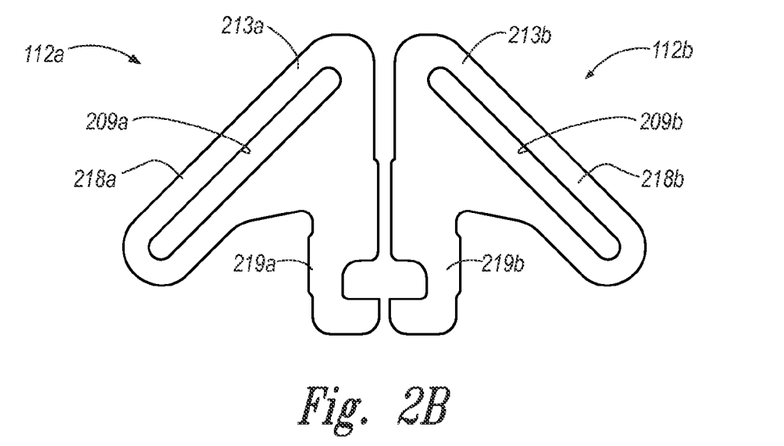
FIG. 2B is a front view of web connector bodies configured in accordance with an embodiment of the present technology.

FIG. 2A is a front view illustrating the web connectors 112 disengaged from the buckle 140. FIG. 2B is a front view of the web connectors 112 with corresponding connector covers 211 (identified individually in FIG. 2A as a first connector cover 211a and a second connector cover 211b) removed to show corresponding connector bodies 213 (identified individually as a first connector body 213a and a second connector body 213b) in more detail. Referring to FIGS. 2A and 2B together, each web connector 112 includes a web receiving portion 216 (identified individually as a first web receiving portion 216a and a second web receiving portion 216b) and a tongue portion 214 (identified individually as a first tongue portion 214a and a second tongue portion 214b). Each tongue portion 214 includes a locking feature 217, such as a hook or pawl opening or cutout, and a plurality of surface features, such as raised ridges 206, formed in the corresponding connector cover 211 and positioned adjacent the locking feature 217.

In the illustrated embodiment, each connector body 213 includes an upper portion 218 (identified individually as a first upper portion 218a and a second upper portion 218b) and a lower portion (identified individually as a first lower portion 219a and a second lower portion 219b) extending downwardly from the corresponding upper portion 218. Each upper portion 218 has a web aperture 209 (identified individually as a first web aperture 209a and a second web aperture 209b) aligned with the corresponding web receiving aperture 108. The upper portion 218 of each connector body 213 and a portion of the corresponding connector cover 211 that covers the upper portion 218 form the corresponding web receiving portion 216. The lower portion 219 of each connector body 213 and a portion of the corresponding connector cover 211 that covers the lower portion 219 form the corresponding tongue portion 214.

The connector covers 211 can comprise a durable material that is molded (e.g., over-molded by injection molding, etc.), bonded, and/or otherwise attached to the corresponding connector body 213 so that is covers or at least substantially covers the connector body 213. In the illustrated embodiment, for example, the connector covers 211 are formed from a plastic material. In this embodiment and others, the connector cover can be formed from a nylon plastic that is glassed filled for enhanced durability and stiffness. For example, in one embodiment, the connector covers 211 can be formed from nylon type 6/6 with 30% glass fill. In other embodiments, the connector covers can comprise other types of plastics (e.g., polypropylene, polytetrafluoroethylene, etc.) and/or other manufactured materials having suitable sufficient durability and stiffness. The connector bodies 213 can be formed from metallic materials, such as plate steel that is stamped or otherwise formed using suitable methods known in the art. In other embodiments, the connector bodies 213 can be omitted from the web connectors 112, and each web connector 112 can be integrally formed from a single material. For example, in such embodiments, the web connectors 112 can be injection molded or die-cast solid components. In one embodiment, for example, each web connector 112 can be integrally formed from a glass-filled (e.g., 40% glass-filled) nylon material. Accordingly, the features of the present technology are not limited to a particular type of web connector construction and can be used with injection molded solid components, die-cast components, over-molded stampings, etc.

In use, the locking feature 217 is configured to engage the internal locking components (not shown) of the buckle 140 in a conventional manner when a user interlocks the web connectors 112 and inserts the tongue portions 214 into an opening (not shown) in an upper side 242 of the buckle 140, as shown by the arrow H. In one aspect of the illustrated embodiment, the relatively thicker plastic material of the connector cover 211 at the ridges 206 decreases the amount of surface-to-surface contact between the tongue portions 214 and the internal contact surfaces (not shown) within the buckle 140 across which the tongue portions 214 slide. This, in turn, reduces friction on the tongue portions 214 as they are inserted into the buckle 140. In another aspect of this embodiment, the plastic material of the connector covers 211 can insulate the user's hands or other areas of the user's body from the metal of the corresponding tongue portions 214, which may become uncomfortably hot to the touch after prolonged exposure to the sun and/or elevated vehicle temperatures on a hot day.

The buckle 140 can include a release actuator or button 246 to release the tongue portions 214 and thereby disengage the web connectors 112 from the buckle. In one embodiment, the individual tongue portions 214 can be configured to engage a buckle assembly generally similar in structure and function to one or more of the buckle assemblies disclosed in U.S. Pat. No. 8,720,019, filed Nov. 10, 2010, and titled "Buckle Assemblies for Personal Restraint Systems and Associated Methods of Use and Manufacture," and/or U.S. patent application Ser. No. 12/357,356, filed Jan. 21, 2011, and titled "Buckle Assemblies and Associated Connectors for Use with Child Seats and Other Restraint Systems," both of which are incorporated herein by reference in their entireties. In other embodiments, the individual web connectors 112 can include tongue portions and/or other locking features configured to engage any of a variety of conventional buckle assemblies.

Figure 3A:
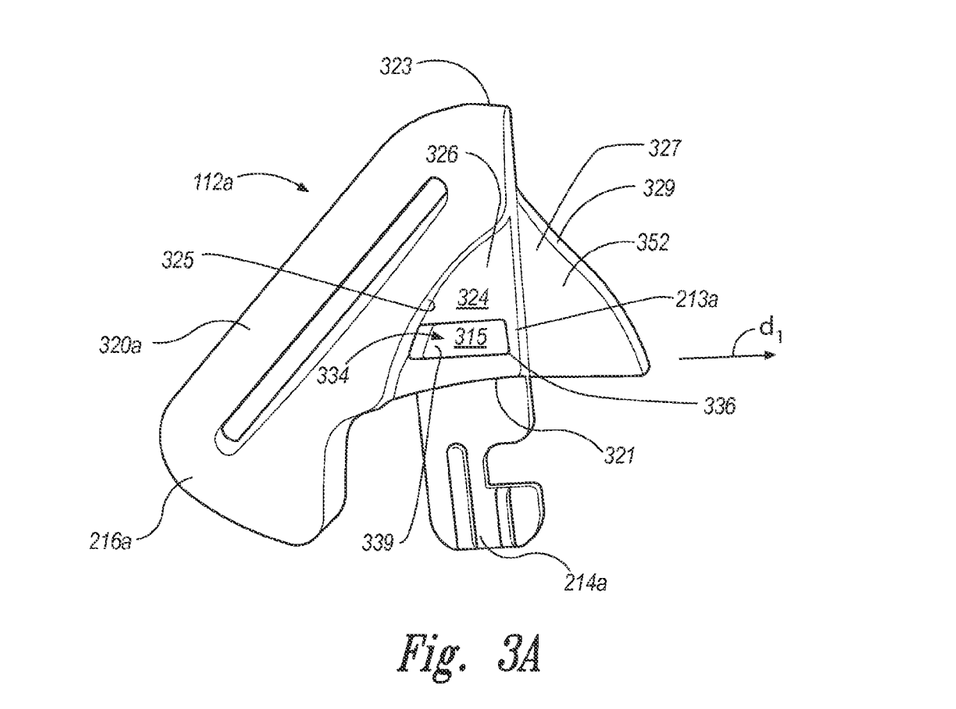
FIGS. 3A and 3B are enlarged front and rear isometric views, respectively, of the first web connector.
Figure 3B:
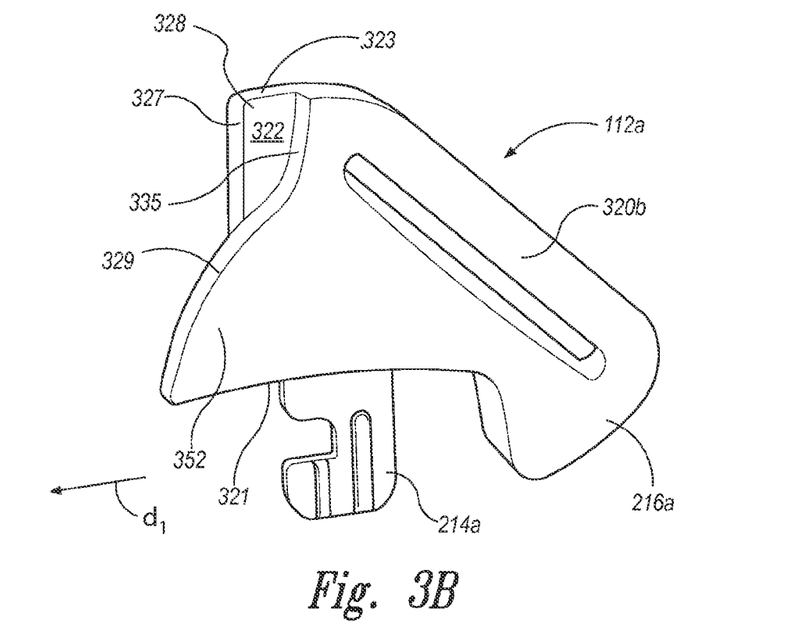

FIGS. 3A and 3B are enlarged front and rear isometric views, respectively, showing the first web receiving portion 216a of the first web connector 112a in further detail. Referring to FIG. 3A, the first web receiving portion 216a has a front side 320a, a first recess 326 adjacent the front side 320a, a back side 320b opposite the front side 320a, and a first projection 352 projecting at the back side 320b. The first projection 352 extends outwardly from a medial edge 327 in a first direction $d_1$. The first projection 352 includes an outer edge 329 extending along a curved path (e.g., an arcuate path) between the medial edge 327 and a lower edge 321 adjacent the tongue portion 214a. The medial edge 327 extends along a generally straight path between the tongue portion 214a and an upper edge 323 of the first web receiving portion 216a.

The first recess 326 includes a first inner edge 325, a contact surface 324 adjacent the first inner edge 325, and a first surface feature 334 formed in the contact surface 324. The first inner edge 325 extends along a curved path (e.g., an arcuate path) between the medial edge 327 and the lower edge 321. In the illustrated embodiment, the first surface feature 334 includes a cavity 336 that extends between the medial edge 327 and the first inner edge 325 in a direction generally perpendicular to the medial edge 327. The cavity 336 has a sidewall 339 and a lower surface 315 adjacent the sidewall 339. In one embodiment, the cavity 336 exposes a metal surface of the connector body 213a. In alternate embodiments, the cavity 336 can extend through the connector body 213a or the cavity can have a shallower depth such that the connector body 213a is not exposed through the cavity 336.

Referring to FIG. 3B, the first web receiving portion 216a further includes a second recess 328 adjacent the back side 320b. The second recess 328 includes a second inner edge 335 and a contact surface 322 between the second inner edge 335 and a portion of the medial edge 327 proximate the upper edge 323. The second inner edge 335 extends generally as an extension of the outer edge 329.

Figure 4A:
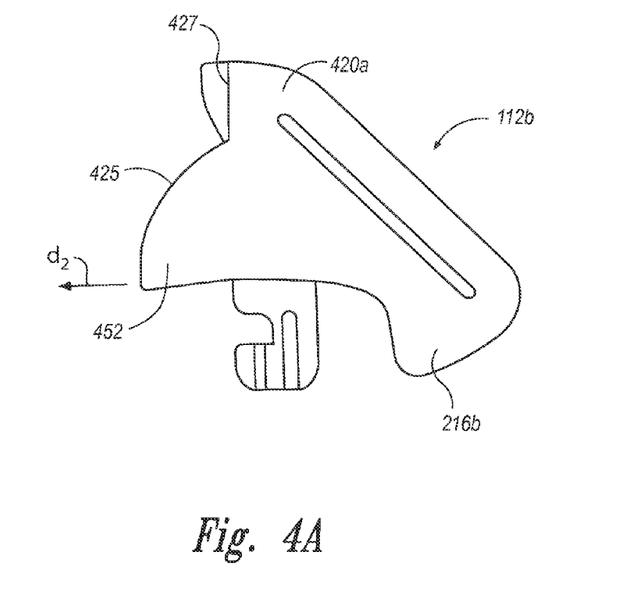
FIG. 4A is an enlarged front view of the second web connector.
Figure 4B:
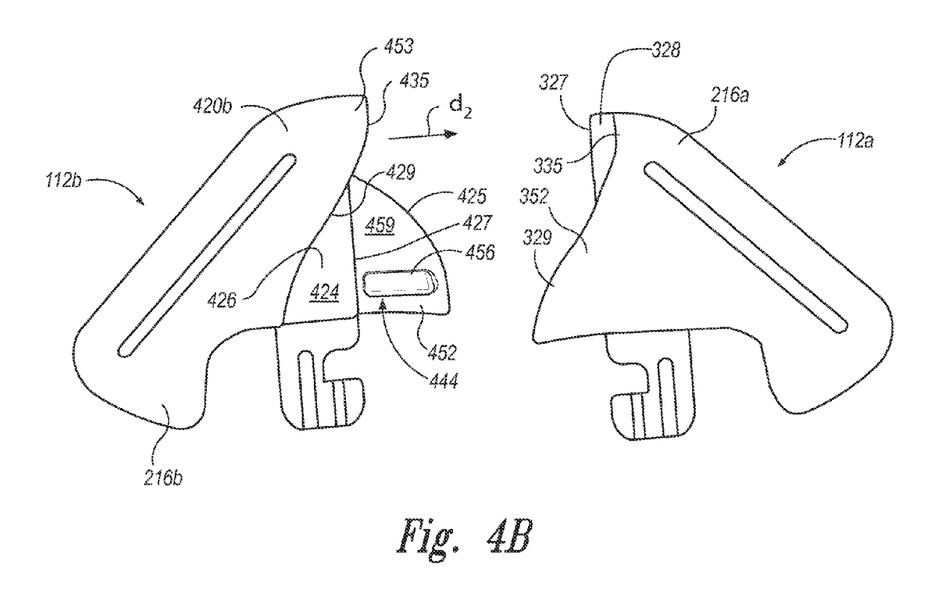
FIG. 4B is an enlarged rear view of the first and second web connectors separated from each other.

FIG. 4A is an enlarged front view of the second web connector 112b, and FIG. 4B is an enlarged rear view of the second web connector 112b separated from the first web connector 112a. Referring to FIG. 4A, the second web receiving portion 216b of the second web connector 112b has a front side 420a and a second projection 452 at the front side 420a. The second projection 452 extends from a medial edge 427 in a second direction $d_2$ generally opposite the first direction $d_1$ shown in FIGS. 3A and 3B. The second projection 452 has a first outer edge 425 and a shape that is the same as, or at least generally similar to, the shape of the first recess 326 (FIG. 3A) of the first web receiving portion 216a so that the second projection 452 can fit snugly in the first recess 326 when the web connectors 112 are properly interlocked with each other.

Referring to FIG. 4B, the second projection 452 has a contact surface 459 and a second surface feature 444 formed on the contact surface 459. In the illustrated embodiment, the second surface feature 444 includes a protrusion 456 projecting from the contact surface 459 in a direction generally perpendicular to the second direction $d_2$ and away from the front side 420a (FIG. 4A). The protrusion 456 has a shape that is the same as, or at least generally similar to, a shape defined by the cavity 336 (e.g., a rectangular shape; FIG. 3A) of the first web receiving portion 216a so that the protrusion 456 can fit closely within the cavity 336 when the web connectors 112 are interlocked with each other. In the illustrated embodiment, the cavity 336 has an elongate rectangular shape. In other embodiments, the cavity 336 can have a different size and/or shape, such as ovular, triangular, square, star, and/or other suitable surface features. In an alternate embodiment, the protrusion 456 can be formed at the first recess 326 and the cavity 336 can be formed at the second projection 452. In some embodiments, the web connectors 112 may include additional sets of surface features (e.g., an additional protrusion and corresponding cavity) formed on one or more of the projections 352 and 452 and one or more of the corresponding recesses.

The second web receiving portion 216b further includes a back side 420b opposite the front side 420a, a third recess 426 adjacent the back side 420b, and a third projection 453 projecting at the back side 420b. The third recess 426 has a contact surface 424, an inner edge 429, and a shape that is the same as, or at least generally similar to, the shape of the first projection 352 so that the third recess 426 can snugly receive the first projection 352 of the first web receiving portion 216a when the web connectors 112 are interlocked with each other. Referring again to FIG. 4A, the third projection 453 extends from the medial edge 427 generally in the second direction $d_2$. The third projection 453 has a second outer edge 435 and a shape that is the same as, or at least generally similar to, the shape of the second recess 328 (FIG. 4B) of the first web receiving portion 216a so that the third projection 453 can be snugly received in the second recess 328 when the web connectors 112 are interlocked with each other. In other embodiments, one or more of the projections 352, 452, and 453 and/or the corresponding recesses 326, 328, and 426 can have different sizes and/or shapes than shown in the illustrated embodiment. For example, in one embodiment, the third projection 453 and the corresponding second recess 328 can be rectangular in shape.

Figure 5A:
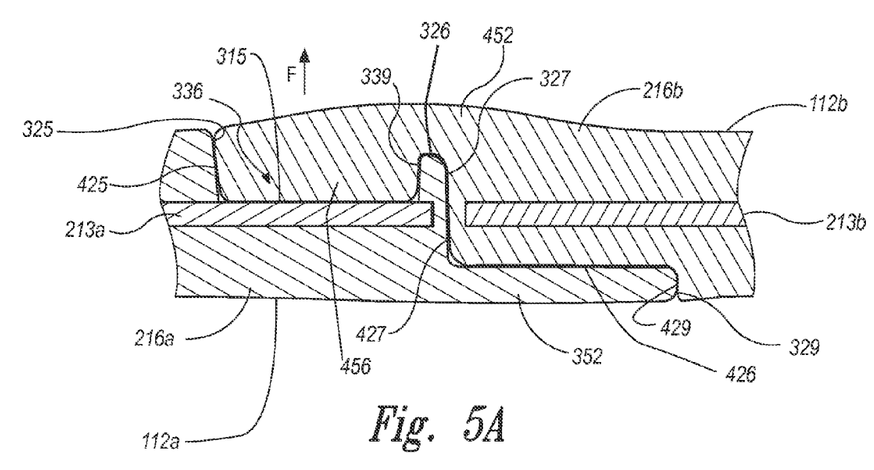
FIGS. 5A and 5B are cross-sectional views taken along lines 5A-5A and 5B-5B, respectively, in FIG. 2.
Figure 5B:
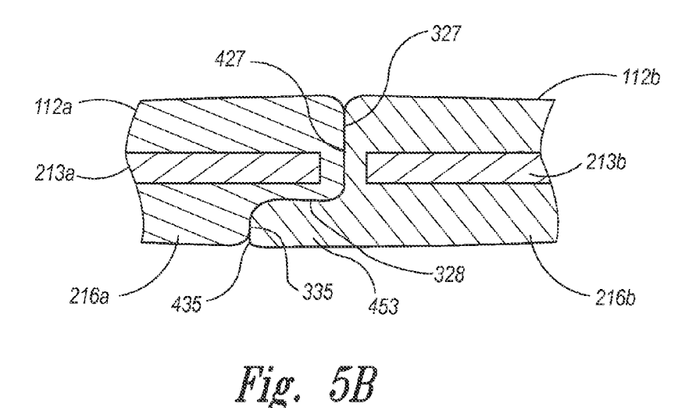

FIGS. 5A and 5B are cross-sectional views of the interlocked connectors 112 taken along lines 5A-5A and 5B-5B, respectively, in FIG. 2A. Referring to FIGS. 5A and 5B together, in use, a user can interlock the web receiving portions 216 by generally sliding the projections 352, 452, and 453 over the corresponding recesses 426, 326, and 328, respectively, while simultaneously rotating one of the web receiving portions 216 relative to the other until the protrusion 456 is inserted into the cavity 336. When interlocked, the edges 325, 327, 329, and 335 of the first web receiving member 216a abut the corresponding edges 425, 427, 429, and 435, respectively, of the second web receiving member 216b, and the protrusion 456 extends into the cavity 336 and contacts the lower surface 315 and the surrounding sidewall 339. Engagement between the various edges and surfaces of the web receiving portions 216 restricts or at least reduces relative movement between the web connectors 112 when they are engaged with the buckle 140 (FIG. 2A). This prevents or at least restricts the web connectors 112 from rubbing and sliding against each other during operation, and reduces or eliminates friction that could potentially lead to undue wear and tear between the web connectors 112. The reduction or elimination of play between the web connectors 112 can also prevent a user's skin and/or clothing from being pinched between the web receiving portions 216 during operation. Additionally, this can further stabilize the web connectors 112 while the user inserts the tongue portions 214 (FIG. 2A) into the buckle 140 and/or ejects the tongue portions 214 from the buckle 140. The user can separate the web receiving portions 216 by slightly twisting one of the web receiving portions 216 relative to the other. The slight twisting motion pulls the protrusion 456 out of the cavity 336 in the direction of arrow F. The web receiving portions 216 can then be pulled apart.

Appendix A includes an isometric view (Figure A1), a front side view (Figure A2), a rear side view (Figure A3), a left side view (Figure A4), a right side view (Figure A5), top side view (Figure A6), and a bottom side view (Figure A7) showing ornamental designs of connectors and a buckle disclosed herein.

From the foregoing, it will be appreciated that specific embodiments of the disclosure have been described herein for purposes of illustration, but that various modifications may be made without deviating from the spirit and scope of the various embodiments of the disclosure. Further, while various advantages associated with certain embodiments of the disclosure have been described above in the context of those embodiments, other embodiments may also exhibit such advantages, and not all embodiments need necessarily exhibit such advantages to fall within the scope of the invention. Accordingly, the disclosure is not limited, except as by the appended claims.

We claim:

1. Interlocking web connectors for use with an occupant restraint system in a vehicle, wherein the interlocking web connectors comprise:
    a first web connector having a first web receiving portion configured to receive a first web and a first tongue portion configured to engage a buckle, wherein the first web receiving portion includes a first side, a second side opposite the first side, a first projection at the first side, and a first recess adjacent the second side, and wherein the first recess includes a first surface and a cavity formed in the first surface; and
    a second web connector having a second web receiving portion configured to receive a second web and a second tongue portion configured to engage the buckle, wherein the second web receiving portion includes a second recess and a second projection, wherein the second projection includes a second surface and a protrusion on the second surface, and wherein the second recess is configured to receive the first projection, the first recess is configured to receive the second projection, and the cavity is configured to receive the protrusion when the first and second tongue portions are engaged with the buckle.

2. The interlocking web connectors of claim 1 wherein:
    the cavity has a generally rectangular shape; and
    the protrusion has a generally rectangular shape corresponding to the rectangular shape of the cavity.

3. The interlocking web connectors of claim 1 wherein:
    the second web receiving portion includes a third projection; and
    the first web receiving portion includes a third recess adjacent the first side, wherein the third recess is configured to receive the third projection.

4. The interlocking web connectors of claim 1 wherein each of the first and second web connectors includes a connector body and a connector cover substantially covering the connector body.

5. The interlocking web connectors of claim 4 wherein a portion of the connector body and a portion of the connector cover form the corresponding tongue portion of each of the first and second web connectors.

6. The interlocking web connectors of claim 5 wherein:
    a portion of the connector body and a portion of the connector cover of the first web receiving portion form the first web receiving portion; and
    a portion of the connector body and a portion of the connector cover of the second web receiving portion form the second web receiving portion.

7. The interlocking web connectors of claim 4 wherein the connector body comprises a metallic material, and wherein the connector cover comprises a plastic material substantially covering the metallic material.

8. First and second web connectors for use with an occupant restraint system in a vehicle, wherein each of the first and second web connectors comprises:
    a web receiving portion having a web aperture configured to receive a web of the occupant restraint system, wherein the web receiving portion includes a first portion of a connector body and a first portion of a connector cover that substantially covers the connector body; and
    a tongue portion configured to be inserted into and releasably engaged with a buckle, wherein the tongue portion includes a second portion of the connector body and a second portion of the connector cover, wherein;
    the web receiving portion of the first web connector includes a first recess and a first projection adjacent the first recess;
    the first recess includes a first inner edge;
    the first projection includes a first outer edge;
    the web receiving portion of the first web connector further includes a first medial edge between the first inner edge and the first outer edge;
    the web receiving portion of the second web connector includes a second recess and a second projection adjacent the second recess;
    the second recess includes a second inner edge configured to abut the first outer edge;
    the second projection includes a second outer edge configured to abut the first inner edge;
    the web receiving portion of the second web connector further includes a second medial edge between the second inner edge and the second outer edge;
    the second medial edge is configured to abut the first medial edge;
    the first recess is configured to receive the second projection; and
    the second recess is configured to receive the first projection, whereby the web receiving portion of the first web connector is configured to interlock with the web receiving portion of the second web connector when the tongue portions of the first and second web connectors are inserted into the buckle.

9. The first and second web connectors of claim 8 wherein the connector bodies comprise a metallic material, and wherein the connector covers comprise a plastic material substantially covering the metallic material.

10. The first and second web connectors of claim 8 wherein the connector bodies comprise a metallic material, and wherein the connector covers comprise glass filled nylon plastic.

11. The first and second web connectors of claim 8 wherein:
    the first recess includes a first surface feature; and
    the second projection includes a second surface feature configured to engage the first surface feature.

12. The first and second web connectors of claim 8 wherein:
    the first recess includes a cavity; and
    the second projection includes a protrusion that is configured to be received by the cavity.

13. The first and second web connectors of claim 8 wherein:
    the web receiving portion of the first web connector further includes a third projection; and
    the web receiving portion of the second web connector includes a third recess configured to receive the third projection.

14. The first and second web connectors of claim 13 wherein:
    the web receiving portion of the first web connector further includes a fourth recess; and
    the web receiving portion of the second web connector further includes a fourth projection configured to be received by the fourth recess.

15. An occupant restraint system for use in a vehicle, the occupant restraint system comprising:

a buckle; and first and second interlocking web connectors, wherein each of the first and second web connectors includes:

a web receiving portion configured to receive a web of the occupant restrain system, and a tongue portion extending from the web receiving portion and configured to releasably engage the buckle, wherein each of the web receiving portions includes (1) means for restricting rotational movement of one of the first and second web connectors relative to the other of the first and second web connectors, and (2) means for restricting translational movement of one of the first and second web connectors relative to the other of the first and second web connectors when the first and second web connectors are interlocked and engaged with the buckle, and wherein:

the means for restricting translational movement includes a projection and a recess, wherein the projection of each of the first and second web connectors is configured to cooperate with the recess of the other; and the means for restricting rotational movement includes a first surface feature formed at the recess of the first web connector and a second surface feature formed at the projection of the second web connector and configured to engage the first surface feature.

16. The first and second web connectors of claim 15 wherein the first surface feature includes a cavity, and wherein the second surface feature includes a protrusion that inserts into the cavity.

\* \* \* \* \*